United States Patent [19]
Chen et al.

[11] Patent Number: 5,422,806
[45] Date of Patent: Jun. 6, 1995

[54] TEMPERATURE CONTROL FOR A VARIABLE FREQUENCY CPU

[75] Inventors: Peng-Cheng Chen, Cupertino; Terng-Huei Lai, Milpitas, both of Calif.

[73] Assignee: ACC Microelectronics Corporation, Santa Clara, Calif.

[21] Appl. No.: 213,924

[22] Filed: Mar. 15, 1994

[51] Int. Cl.$^6$ ............................................. G05B 13/04
[52] U.S. Cl. ................... 364/149; 364/150; 364/153; 364/166
[58] Field of Search ............. 364/148, 149, 150, 151, 364/153, 166, 176, 550, 557; 395/700

[56] References Cited

U.S. PATENT DOCUMENTS

| | | | |
|---|---|---|---|
| 4,425,624 | 1/1984 | Planche | 364/802 |
| 4,823,290 | 4/1989 | Fasack et al. | 364/550 |
| 4,937,763 | 6/1990 | Mott | 364/550 |
| 5,274,797 | 12/1993 | Barlow et al. | 395/575 |
| 5,287,292 | 2/1994 | Kenny et al. | 364/550 |
| 5,339,425 | 8/1994 | Vanderah et al. | 395/700 |
| 5,367,670 | 11/1994 | Ward et al. | 395/700 |

Primary Examiner—Paul P. Gordon
Attorney, Agent, or Firm—Schneck & McHugh

[57] ABSTRACT

A thermal control system for variable speed microprocessor with a piecewise estimate of temperature change. The estimate is modeled after actual temperature change measurements of a microprocessor operating at low and high speeds and is recorded in a digital format in storage registers, one set of registers for each operating frequency. A counter counts sample microprocessor clock signals for a time over which the microprocessor speed is operating at a specific speed and provides a basic count signal. This basic count signal is incremented or decremented by comparison with stored values of the piecewise estimate of temperature change. As the basic signal increases or decreases, new slopes are provided to the counter for adjusting the basic count, upwards or downwards, depending on whether the system speed is high, intermediate or low. The adjusted counter output is also fed to comparators, which monitor a desired upper and lower temperature limit. As the upper limit is approached, control logic implements a throttling algorithm to maintain temperature in the desired range. The present invention takes into account the operating history of the system in a particular environment since the system powers on, including idleness of the system.

10 Claims, 3 Drawing Sheets

TEMPERATURE CONTROL FOR A VARIABLE FREQUENCY CPU

TECHNICAL FIELD

The invention relates to thermal control of electronic devices and, more particularly, to thermal control of variable frequency microprocessors.

BACKGROUND ART

Microprocessor speeds have been increasing at a rapid pace. The present invention deals with that class of microprocessor which operates with different speed modes, including at least a high and low speed mode. With each increase in speed, there is a tendency for further heating of the device, as well as increased power consumption. Overheating of a chip leads to thermal instabilities and later to failure of transistors and of the entire chip. In a compact computer system, such as a laptop computer, there is a dual objective of prolonging battery life and restricting the temperature of the CPU to a tolerable level.

There are two basic temperature control schemes, a closed loop system and an open loop system. The closed loop system requires a temperature sensor attached to the point of temperature criticality of the microprocessor and an analog-to-digital converter to transfer the temperature measurement into a signal which can be used by the system hardware or software to determine whether or not the system speed should be reduced. This approach is very accurate but is more expensive than the open loop system. It also increases the complexity of the system design.

In most applications, an open loop temperature control system is used. Such a system predicts heat accumulation and heat dissipation as functions of both time and operating frequency. The system provides temperature control based upon a selected model. An example of this predictive approach is found in U.S. Pat. No. 4,425,624 (Plenche), where various known currents and resistances are used to model the thermal behavior of an electronic device to simulate temperature rise as a function of time.

If an open loop approach is applied to a variable or multiple speed microprocessor, the system is forced to switch speeds from a high frequency to a low frequency after running at a high frequency for a certain period of time. This technique, known as throttling, assumes the temperature changes are linearly proportional to the amount of time of operation of a microprocessor at a particular frequency.

The real situation is that the temperature versus time relationship is nonlinear and generally follows a flattening exponential curve. A second drawback is that the predictive approach usually counts low speed time due to throttling but ignores low speed time induced by system idleness. When a system idle condition occurs, the usual procedure is to reset the counting of high speed time or to stop counting. As a result, heat dissipation is either underestimated or overestimated.

An object of the invention is to provide an open loop temperature control system which more accurately emulates the temperature versus time relationship and provides microprocessor cooling accordingly.

SUMMARY OF THE INVENTION

The above object has been satisfied by modeling the curve representing the temperature versus time relationship of a variable frequency microprocessor over at least a significant portion of the operating history of a microprocessor since power on during a typical run. A piecewise approximation having slope and turning points, representing the curve, is placed in memory for comparison with a counted clock signal representing a temperature value at particular system frequencies: high, intermediate, or low. The counted clock signal, termed a count signal, is adjusted upwards or downwards by feedback to the memory, where the piecewise model of the temperature curve is stored. If the count represents a high frequency mode count, a first group of memory elements is consulted to generate an increment to the count signal. If the count signal represents a low frequency mode count, a second group of memory elements is consulted to appropriately decrement the count signal. Thus, the count signal is adjusted by a feedback loop which takes into account whether the microprocessor is running in a high speed, a low speed, or a very low speed mode. The adjusted output signal is compared to an upper or a lower limit so that when the upper limit of temperature is approached, throttling of the microprocessor speed may occur. Two throttling modes are employed. A first mode keeps the temperature characteristic near the upper limit of desired temperature, meaning that the high frequency mode may be employed most of the time. A second mode takes the microprocessor speed between the high level and low levels of microprocessor speed in successive intervals.

In a second embodiment, the model is not placed in memory at the outset, but its turning point and slope values are computed on-the-fly, based upon operating speed of the microprocessor and time of operation at that speed, using a formula which represents the model. The computation yields an estimated temperature which can invoke the throttling modes described above.

An advantage of the invention is that the system's operating history is automatically tracked, the current system temperature is dynamically and adaptively adjusted.

Even though the present temperature control system employs feedback to adjust the output count signal, no temperature measurements are needed or made. Rather, a piecewise estimate of temperature change is employed, which reflects variation between different frequency or speed modes and may be adjusted or calibrated in accord with realistic measurements or estimates of actual temperature conditions.

BEST MODE FOR CARRYING OUT THE INVENTION

Figure 1:
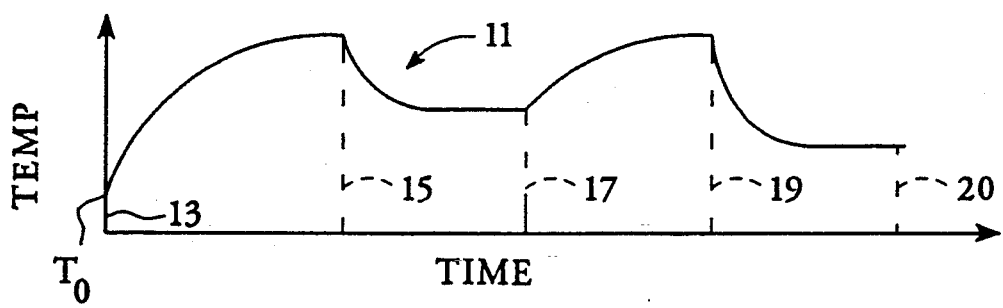
FIG. 1 is a plot of a measurement of actual temperature change in a microprocessor between high speeds of operation and low speeds of operation with respect to time.

With reference to FIG. 1, the curve 11 represents an actual measurement of microprocessor temperature as a function of time as the microprocessor runs at different speeds. Temperature is represented on the y-axis and time is represented on the x-axis. The curve 11 starts at a low temperature on the y-axis 13 at $T_0$ and, during a high speed interval of operation, between y-axis 13 and vertical dashed line 15, approaches a maximum temperature where the curve tends to flatten out. Between dashed lines 15 and 17, the microprocessor operates at a low speed of operation, and temperature drops to a lower limit near vertical dashed line 17. At vertical line 17, the high speed mode of operation is again started and temperature again begins to climb toward the maximum. Having reached the maximum temperature near vertical line 19, the microprocessor operates at its lowest speed, perhaps a suspend mode, and temperature drops to its lowest point, near the vertical dashed line 20, where temperature is near $T_0$. In this example, the high speed mode of operation might be 66 MHz, the low speed mode of operation could be 16 MHz and the lowest speed might be about 1.0 Mhz or even 0 Hz.

Figure 2:
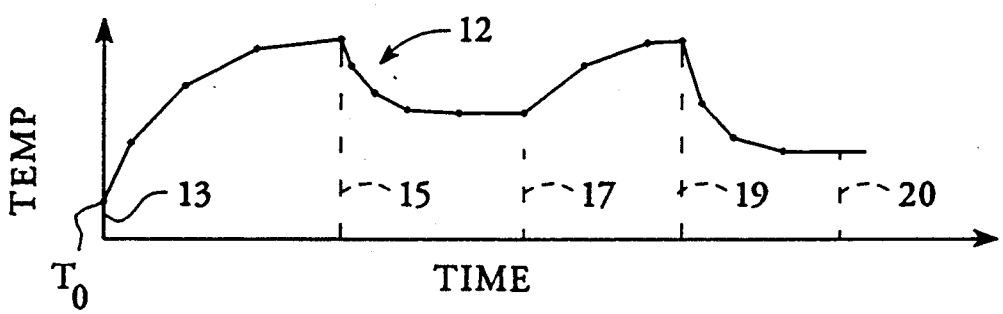
FIG. 2 is a plot of a piecewise estimate of temperature change of a microprocessor, simulating the actual temperature change shown in FIG. 1, plotting temperature versus time.

The curve of FIG. 1, which generally has exponential segments, is modeled by piecewise linear segments in the curve 12 of FIG. 2. In FIG. 2, time intervals of high speed, low speed, and lowest speed of operation are the same as in FIG. 1, but, by simulating the curve with linear segments, it is possible to digitally store a representation of the actual temperature change in registers. Piecewise segments are stored as vectors, each having a turning point (P) and a slope (S). Different vectors are associated with each microprocessor speed. Slopes associated with the high speed of operation are stored in one set of registers, while slopes associated with the low speed of operation are stored in a second group of registers, and so on for each speed. Slopes associated with the high speed of operation will generally be positive slopes, while slopes associated with the low speed of operation will generally be negative, and slopes associated with the lowest speed of operation will generally be even more negative. Regardless of the operating frequency, the slopes could be positive or negative or flat depending on the current system temperature. The slopes increment or decrement a base count rate, representing system temperature change.

The decision regarding whether to increment or decrement the output count is based upon the system speed. When the system speed is high, the count is incremented; when the speed is low, the count is decremented. Generally speaking, slope will be positive if the current system temperature has not reached the upper limit for a particular speed and will be negative if over the upper limit and close or equal to zero if it reaches the upper limit. The adjusted output signal is not only fed back for further adjustment, but also is fed to system speed throttling control logic. This logic implements a throttling mode, which adjusts the microprocessor speed downward as the estimated upper limit of temperature, based on adjusted count, is reached. The throttling mode may be applied either in a pre-programmed fixed ratio of low frequency to high frequency run intervals or the count rate may be taken from the upper limit to a lower limit and, when the lower temperature limit is reached, then the high speed mode of operation may be restored until the count again reaches the upper limit. The pre-programmed fixed ratio is one that is selected to give temperature stability. This will depend upon the particular operating environment of each microprocessor. The microprocessor is tested at its operating environment, and the ratio of high and low frequency run intervals which yield temperature stability is determined. This ratio is then set in the throttling control logic. The two modes of microprocessor throttling allow adequate temperature control of the microprocessor, while also allowing the microprocessor to run at a high speed mode for much of the time when the high speed operation is required.

Figure 3:
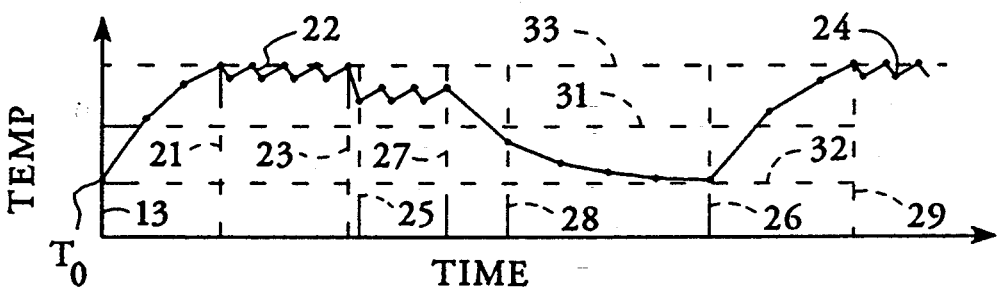
FIG. 3 is a plot of temperature versus time for a high and low speed microprocessor employing dithering throttling for cooling, in accord with a first embodiment of the present invention.

With reference to FIG. 3, the piecewise estimate of FIG. 2 has been adjusted at line 21, after running in the high speed mode. Throttling is done at region 22 by forcing the low speed mode for a short interval, then allowing a resumption of the high speed mode until the high speed mode again reaches the upper limit, and then forcing the low speed mode. This may be done by a high to low speed fixed ratio, determined with stability in mind, as described above. This mode of throttling is employed only when the microprocessor attempts to run at or near the high speed mode.

At interval 23, the microprocessor encounters a system idle condition which takes the signal at a downward direction until the idle condition ceases at line 25, whereupon throttling again is employed. At interval 27, further system idleness is encountered and the count again drops toward a lower limit indicated by dashed line 31. At interval 28, the microprocessor encounters the suspend mode of operation, where the microprocessor frequency drops to its lowest rate and, consequently, temperature falls even below the normal lower limit. This continues to a level indicated by the horizontal dashed line 32, which is very close to $T_0$, the starting temperature. At interval 26, the high speed mode is encountered and the count is incremented, climbing toward the upper limit, indicated by dashed line 33 at the vertical line 29. As the count climbs towards the upper limit and approaches this limit, the fixed ratio throttling mode is applied to the right of line 29, as indicated by dithering region 24.

Figure 4:
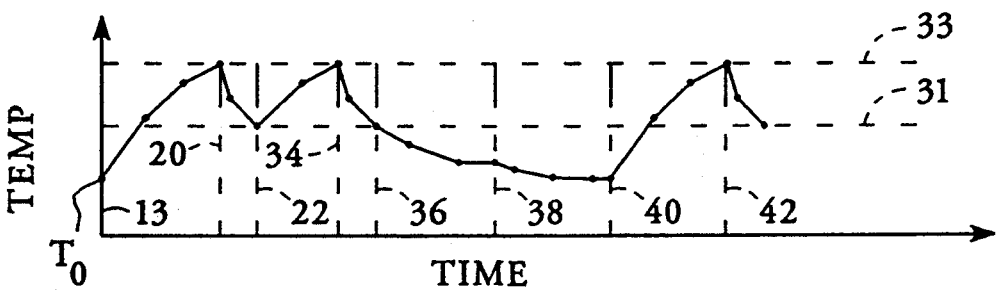
FIG. 4 is a plot of temperature versus time for a high and low speed microprocessor, showing minimum-maximum throttling.
Figure 5:
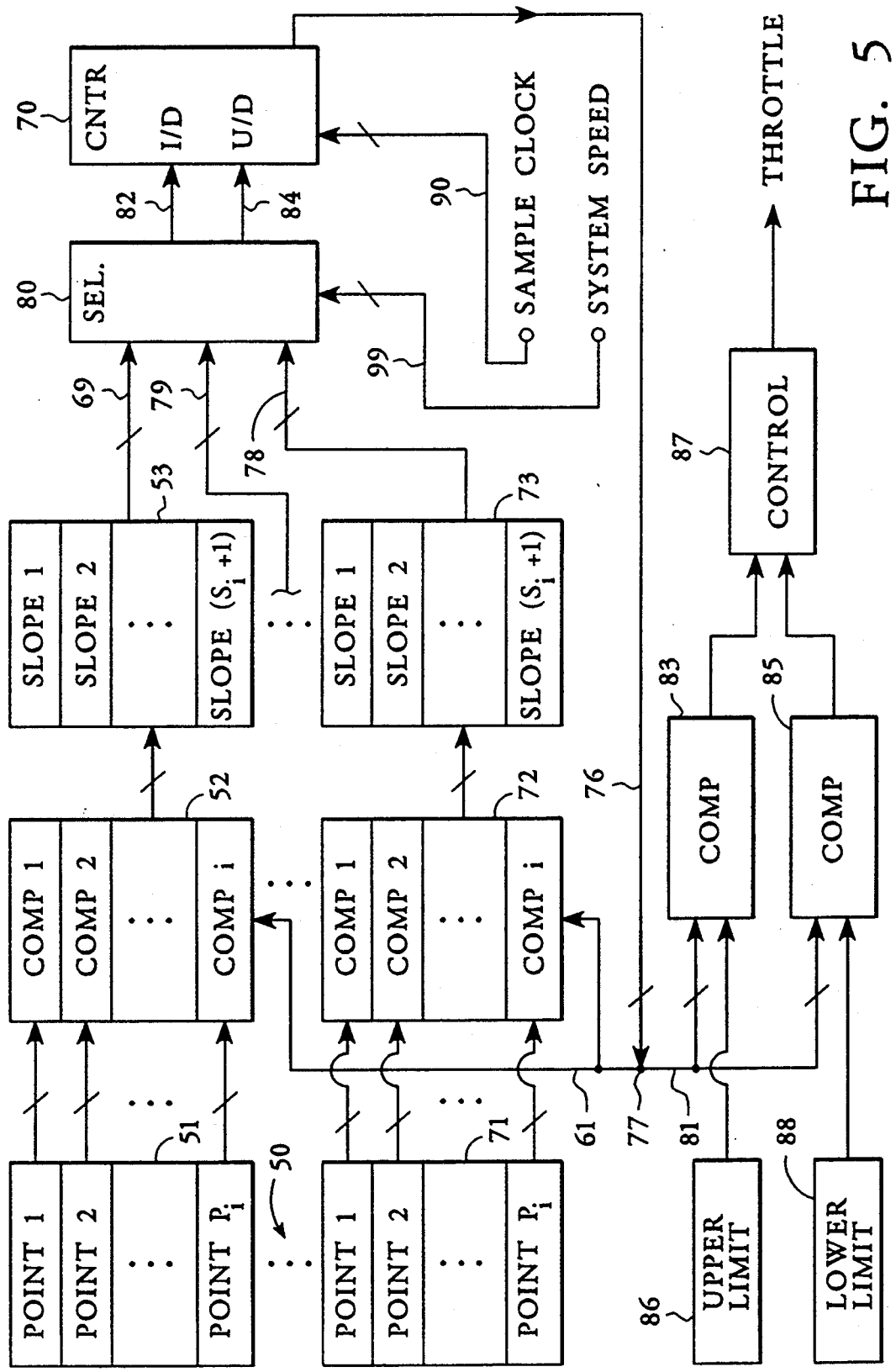
FIG. 5 is a block diagram of a feedback circuit for implementing the temperature control system of the present invention.

In FIG. 4, a different throttling mode is employed. The count starts from a relatively low temperature, $T_0$, indicated by the y-axis 13. Afterwards, the count signal approaches its upper limit, indicated by horizontal dashed line 33, at the intersection with vertical line 20. At this point, the low speed mode is forced until the count approaches the desired lower limit line 31, indicated by dashed line 22. The high speed mode increments the count until the upper limit is again approached at dashed line 34, where the low speed mode is again forced to line 36. A low speed mode due to system idleness may force the count even further down, possibly exceeding the lower limit line 31, as indicated by dashed line 38. The lowest speed mode is encountered, due to a suspend mode of operation, forcing the count even lower, indicative of cooling to a temperature similar to the starting temperature, which occurs at dashed vertical line 40. Likewise, another set of registers, not shown, would store turning points, P, and slopes, S, for each additional mode of microprocessor operation. FIG. 5 does not show registers for the lowest speed mode of operation, but these would be similar to the ones described above. In general, n sets of registers and comparators are provided for n speed modes of operation, indicated by the dots 50, where "n" is an integral number. The high speed mode eventually is requested at line 40 and begins. This allows the count to increment until it reaches line 33 at the intersection of line 42. At line 33, a low speed mode is encountered due to system idleness, and the count once again falls toward the desired lower limit 31. This mode of cooling is a min-max throttling mode, which is simpler than the dithering mode explained with reference to FIG. 3.

With reference to FIG. 5, a set of registers, 51 and 53, store points and slopes, respectively, of the vectors for the upwardly directed curve between vertical lines 13 and 15, associated with the high speed mode of operation. The first register 51 stores turning points for each piecewise segment, while the register 53 stores an associated slope corresponding to each point.

In a like manner, downward piecewise estimates of temperature change, shown between vertical lines 15 and 17 in FIG. 2, are stored in registers 71 and 73, associated with the low speed mode of operation. Register 71 stores the turning point of each downward sloping segment while register 73 stores slope values. The slope values are numbers representing the geometric ratio of the rise to run, i.e., $\Delta y/\Delta x$, for each piecewise segment.

Between the registers 51 and 53 and between the registers 71 and 73 are turning point comparator registers 52 and 72, respectively. The turning point comparators receive an input signal along line 61 which allows selection of the next nearest point to the value on line 61 so that the appropriate slope in register 53, 73 and other registers may be selected via lines 69, 78 and 79. Actually, slope signals from all appropriate ($S_i$) slope registers are transmitted to selector switch 80, which selects one based upon system speed transmitted along line 99. Counter 70 is incremented or decremented by the slope value and direction. The amount of increment or decrement is transmitted to counter 70 along line 82, while the direction of change, up or down, is transmitted to counter 70 along line 84.

Counter 70 operates by providing a basic count signal derived by counting a sample of the CPU clock frequency, provided along line 90, and counting such clock pulses for the duration at which the system speed maintains its value. The output signal from counter 70 is taken along line 76 and is intended to approximate a value of microprocessor temperature. The output signal is fed to a junction 77, where the current count output is transmitted along line 61 for comparison to points in registers 51 and 71 to determine whether a new slope is appropriate. Such a new slope would change the increment or decrement value to the output signal. In other words, selection of a first point in register 51, which is selected by a first comparator in the comparator bank 52, leads to a first slope 53 which increments counter 70. Assume that the rate of incrementing it is at a steep rate. This causes the output signal on line 76 to rapidly be increased from the value associated with the first point and so a second point in register 51 will become associated with the signal coming in on line 61, by means of a comparison, and a new slope will be associated after the comparison has been made.

Assume that this slope will be different from the first slope. This causes a change in the signal on line 69 and so the increment to the basic signal in counter 70 derived from the clock samples will be modified. This leads to a different count on output line 76, which is again compared with signals on the first set of registers so long as the high system speed is used. When the low system speed is used, the same process is used, but using registers 71 and 73 for points and slopes. Register 72 is used for comparisons with the counter output signal arriving on line 61. Although the term "registers" has been used to describe storage locations, any memory locations may be used. The term register does not imply any particular type of hardware, but is intended to define a location where data may be stored and accessed.

The signal at the junction 77 serves a further purpose. The signal is fed along line 81 to a pair of digital comparators 83 and 85. Comparator 83 has an input associated with the upper limit line 33 in FIGS. 3 and 4, set in register 86. Comparator 85 has a lower limit level associated with line 31 in FIGS. 3 and 4, set in register 88. The upper and lower desired temperature limits are set in respective registers 86 and 88 for comparison with the count signal arriving on line 81. As the count signal approaches the upper or lower limit, the comparators influence the throttling control logic, represented by block 87. In the case of the upper limit being approached, comparator 83 sends a signal to control logic 87, which implements either the throttling algorithm represented in FIG. 3 or the throttling algorithm represented in FIG. 4. A lower limit signal from comparator 85 merely causes the control logic 87 to terminate throttling. In this manner, either type of throttling provides thermal equilibrium, maintaining a microprocessor between desired upper and lower temperature limits.

Figure 6:
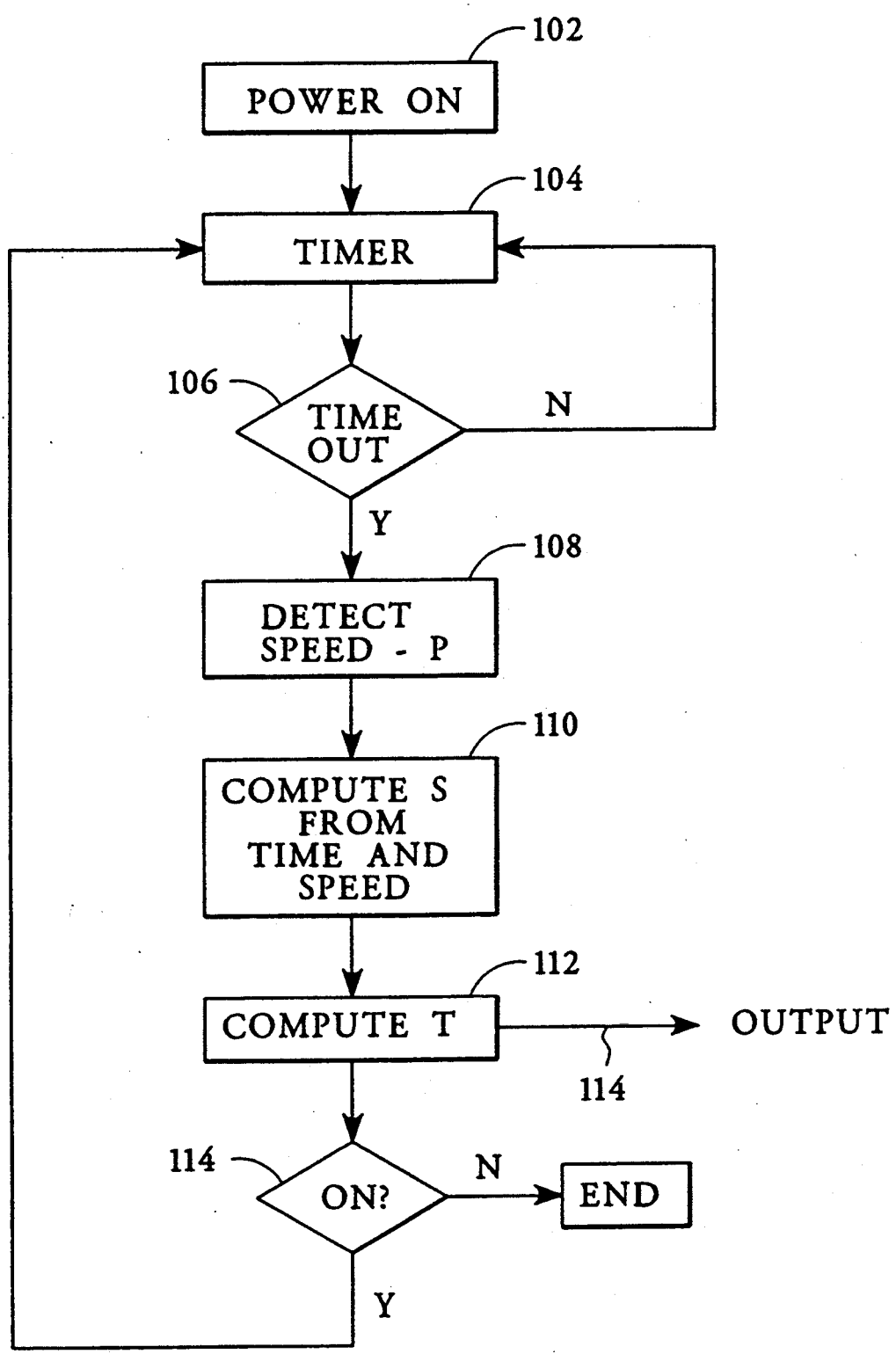
FIG. 6 is a flow chart of a software implementation of the present invention.

One of the characteristic features of the present invention is that the temperature model is based upon an accumulated operating history of the CPU, taking into account all modes of operation. It is not necessary to use hardware to implement the invention. Hardware is used in situations where memory storage is readily available. However, the use of a mathematical model allows reduction of the model to a formula, expressed mathematically as a formula or set of formulae, illustrated by the piecewise approximation of FIG. 2, allowing real time calculation of slopes. In the flow chart of FIG. 6, the software implementation is shown. Power on, indicated by block 102, initiates counting in timer block 104. If there is no time out condition, indicated by block 106, a speed detection calculation is initiated, indicated by block 108. Once the speed is known and once the time of operation at a particular speed is known, a slope is computed, indicated by block 110, using a formula associated with the slopes of FIG. 2. This is indicative of a temperature 112, which can generate an output signal, similar to the output signal generated by the apparatus of FIG. 5. However, desired upper and lower temperature limits and a comparison of these limits may also be executed in software to implement a programmable throttling mode. The process may continue, indicated by block 114, as long as the system is on. It will be realized that the computation of turning points and slopes, based upon a model of the type shown in FIG. 2, is a simple calculation which may be carried out in real time. Similarly, the throttling logic can be reduced to a formula and implemented computationally.

The invention has been described with respect to high, low and lowest microprocessor speed modes. The invention may be implemented with any number of micro-processor speeds and may be modeled with a piecewise estimate of temperature change based upon the various modes. One may merely provide for each mode, but the basic count increment and decrement approach is applied in the same manner.

We claim:

1. A method of temperature control for a CPU whose frequency is variable and whose temperature change characteristics over time are a non-linear function of clock rate comprising, determining a piecewise estimate of CPU temperature change as a function of time over an accumulated operating history of the CPU, wherein the CPU operates at different frequencies, said estimate having a determined upper and lower temperature limits corresponding to desired CPU operating frequencies, measuring the frequency at which a CPU is operating, measuring the elapsed time at which the CPU is operating at said frequency, correlating the measurements of elapsed time and frequency with the piecewise estimate of CPU temperature change, and throttling the CPU frequency if the piecewise estimate of CPU temperature approaches said upper limit.

2. The method of claim 1 wherein the correlating of the measurements of elapsed time and frequency with the piecewise estimate of CPU temperature change is done by storing in memory points and slopes defining piecewise segments of said estimate of CPU temperature change as a function of time and then generating a count signal based on the measurements of CPU operating frequency and elapsed time of operation at a particular frequency, the count signal being incremented or decremented based upon the magnitude and direction of the applicable piecewise segment.

3. The method of claim 1 wherein the throttling of the CPU frequency is between upper and lower limits.

4. The method of claim 1 wherein the throttling of the CPU frequency is dithered near said upper limit.

5. The method of claim 1 wherein the correlating of the measurements of elapsed time and frequency with the piecewise estimate of CPU temperature change is done by computing points and slopes defining piecewise segments of said estimate of CPU temperature change as a function of time and then generating a count signal based on the measurements of CPU operating frequency and elapsed time, the count signal being incremented or decremented based upon the magnitude and direction of the applicable piecewise segment.

6. An apparatus for temperature control of a CPU whose frequency is variable and whose temperature change characteristics over time are a non-linear function of clock rate comprising, counter means having CPU frequency and elapsed time at said frequency as inputs and generating a count signal as an output, a plurality of memory locations for storing piecewise segments of a piecewise estimate of CPU temperature change as a function of time that the CPU operates at different frequencies, said estimate having an upper and lower limit for corresponding desired CPU operating temperatures, said memory locations receiving the count signal for comparison with an appropriate piecewise segment, and means for throttling the CPU frequency if the piecewise estimate of CPU temperature approaches said upper limit.

7. The apparatus of claim 6 further comprising feedback means for adjusting said count signal with current CPU frequency and elapsed time data.

8. The apparatus of claim 6 wherein said means for throttling the CPU frequency comprises means for dithering the CPU frequency corresponding to a temperature region near the maximum desired temperature.

9. The apparatus of claim 6 wherein said means for throttling the CPU frequency comprises means for lowering the CPU frequency from a first frequency associated with a desired upper temperature limit to a second frequency associated with a desired lower temperature limit.

10. The apparatus of claim 6 further comprising selector means connected to receive outputs from said memory locations and a system speed signal, said selector means having an output connected to said counter means responsive to the system speed signal.

* * * * *